Sept. 3, 1940.　　　　E. J. COOK　　　　2,213,305
DUPLICATING MACHINE
Filed Dec. 20, 1937　　　6 Sheets-Sheet 1

Fig. 1.

INVENTOR.
Everett J. Cook
BY
ATTORNEY.S

Sept. 3, 1940.  E. J. COOK  2,213,305
DUPLICATING MACHINE
Filed Dec. 20, 1937   6 Sheets-Sheet 2

Fig. 2.

INVENTOR.
Everett J. Cook
BY
ATTORNEY.S

Fig. 4.

Sept. 3, 1940.   E. J. COOK   2,213,305
DUPLICATING MACHINE
Filed Dec. 20, 1937   6 Sheets-Sheet 6

Patented Sept. 3, 1940

2,213,305

UNITED STATES PATENT OFFICE 2,213,305

DUPLICATING MACHINE

Everett J. Cook, Toledo, Ohio, assignor to H. H. Buggie & Company, Toledo, Ohio, a corporation of Ohio Application December 20, 1937, Serial No. 180,909

28 Claims. (Cl. 90—13.5)

This invention relates generally to duplicating machines and refers more particularly to apparatus of this character having a tool controlled by an optical system which includes a photoelectric cell positioned to scan the pattern to be duplicated.

It is one of the principal objects of this invention to provide a duplicating machine having a plurality of work shaping tools predeterminedly located with respect to a corresponding number of work blanks and operated as a unit to form each of the work blanks to the exact shape of a pattern by means controlled by a single optical system located in a position to scan the pattern and including a photoelectric cell. Thus, it will be seen that the present invention renders it possible to simultaneously fashion a plurality of work blanks to the exact shape of a given pattern with a single control system and, as a result, production of the work is not only expedited, but the cost of manufacture is appreciably reduced.

Another feature of this invention resides in the novel means provided for effecting the required relative movements of the pattern and optical system to insure scanning the entire surface of the pattern to be duplicated and for effecting similar relative movements of the work blanks and associated tools. In the specific embodiment of the invention, provision is made for feeding the tools and optical system as a unit relative to the work and pattern in directions transverse to each other so that the entire surface of the pattern to be duplicated is scanned by the optical system and the corresponding surfaces of the work blanks are traversed by the tools.

Still another feature of this invention consists in maintaining the cutting end portion of each tool substantially normal to the adjacent work blank during the forming operation by oscillating the work blanks relative to the tools. This feature is particularly advantageous in cases where the surface to be duplicated on the work blanks is arcuate or rounded in contour.

A further object of this invention is to provide a duplicating machine wherein the tools are maintained substantially normal to the surfaces of the work blanks, being shaped, irrespective of whether these surfaces are relatively straight or curved by incorporating means in the machine for independently controlling the oscillation of the work blanks and the operation of the transverse feeding means in accordance with the shape of the surface of the pattern to be duplicated. For example, when cutting a relatively straight transverse portion of the surface, provision is made for discontinuing the oscillatory movement of the work blanks and when cutting arcuate or curved portions of the surface, the traversing feed is rendered inoperative. On the other hand, when cutting surfaces of various intermediate contours, it may be desirable to employ both movements and the machine is, of course, designed to provide for this contingency.

A further object of this invention resides in the provision of means for simultaneously and automatically reversing the direction of oscillation of the work blanks and pattern, and the traversing movement of the tools and optical system relative to the work blanks and pattern.

Still another advantageous feature of this invention resides in the provision of means for advancing the tools and optical system by a step by step movement in a vertical direction relative to the work blanks and pattern at the end of transverse movement of the tools and optical unit in each direction.

A still further object of this invention consists in the provision of means for preventing relative traversing movement between the tools and work blanks during the interval the tools are fed into the work.

In addition to the foregoing, the present invention contemplates a relatively simple, compact machine for accomplishing the above results, and the latter, as well as other features of the invention will be made more apparent as this description proceeds, especially when considered in connection with the accompanying drawings, wherein:

The machine selected for the purpose of illustrating this invention is designed to form molds and is particularly adapted to form bottle molds, although it will be apparent from the following description that the principles involved may be advantageously used in duplicating numerous other types of articles. In accordance with conventional practice, the complete bottle mold comprises a plurality of sections which, when assembled, cooperate to provide a cavity identical in shape and size to the particular bottle it is desired to manufacture. In the present instance, the bottle mold comprises two complementary sections and both of these sections are fashioned by the machine forming the subject matter of this invention. In the event, however, that one side of the bottle to be reproduced differs from the opposite side, the mold sections are, of course, not complementary but, nevertheless, may be fashioned on the machine about to be described by merely respectively scanning both sides of the bottle template in forming the two sections of the mold. In either case, the same principles of operation are used to form both sections and, accordingly, the following description will be limited to the formation of only one of the sections.

Figure 1:
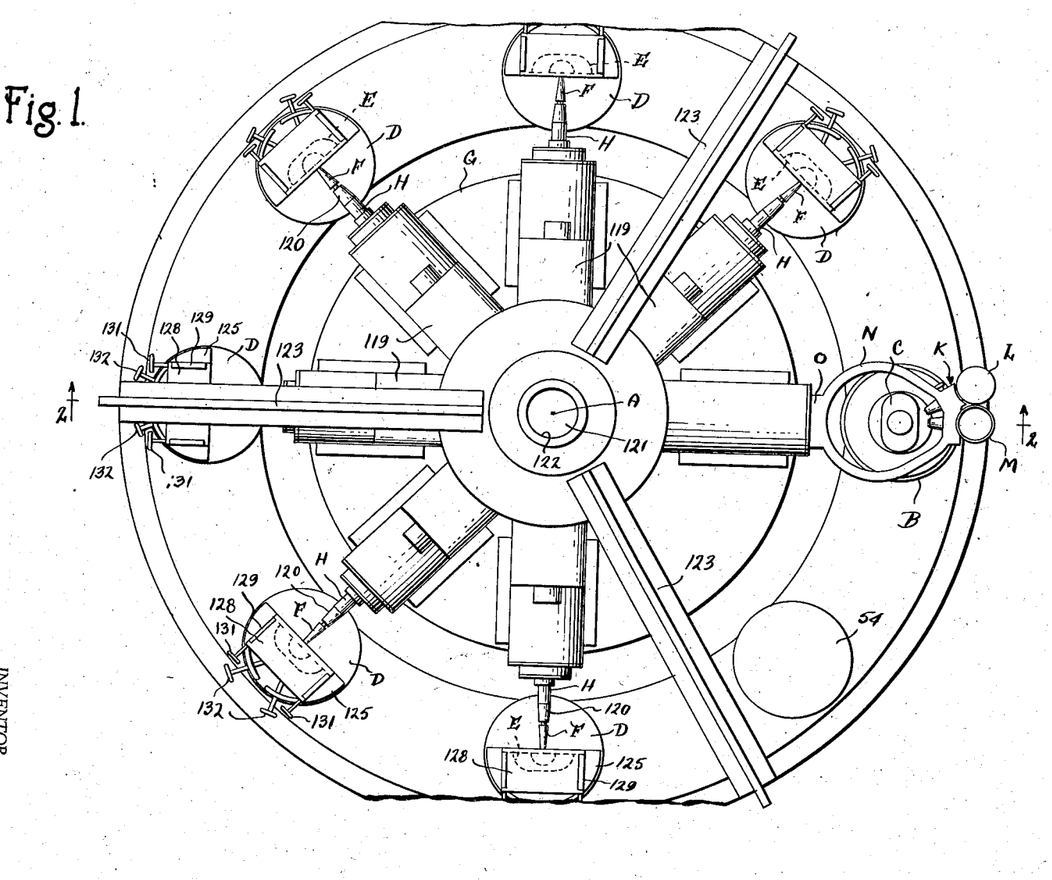
Figure 1 is a plan view of a machine constructed in accordance with this invention.

In general, the machine selected herein for the purpose of illustrating the present invention comprises eight stations, six work supporting stations, one control station, and one pattern supporting station. Upon reference to Figure 1, it will be noted that the stations are concentrically arranged with respect to a vertical axis A and are spaced equal distances from each other around this axis. Located at each of the stations is a face plate supported for oscillation about a vertical axis and provision is made for oscillating the face plates as a unit.

The face plate B at the pattern station is adapted to support a model C preferably covered with an aluminum, or some other light colored paint to enhance its reflection qualities and corresponding exactly in shape to the bottle it is desired to cast in the mold formed by this machine. Clamped to each of the face plates D is a work blank E of the dimension required to form one-half of the mold cavities within which the bottles are to be cast. It will, of course, be understood that the pattern C and work blanks E are secured to their respective face plates for oscillation therewith as a unit.

Supported opposite each of the work blanks E at the radially inner sides of the latter is a tool F having a tapered cutting end for engagement with the radially inner surface of the work blank. The tools F are carried by a table G supported for oscillation about the vertical axis A and also movable vertically along the axis A by a step-by-step movement. The tools F extend radially outwardly from the vertical axis A in a common horizontal plane and each tool is mounted in the outer end of a revoluble spindle H supported on the table G for movement radially of the axis A toward and away from the radially inner surface of the adjacent work blank. In the present instance, the spindles H and associated tools F are moved radially in unison by fluid pressure means I including a piston J reciprocably mounted on the axis A and operatively connected to each of the spindles H. The general arrangement is such that when the piston J is moved in an upward direction, the tools F are moved radially outwardly toward the work blanks and when the piston is moved downwardly, the tools F are simultaneously moved in the opposite direction away from the work blanks.

Figure 2:
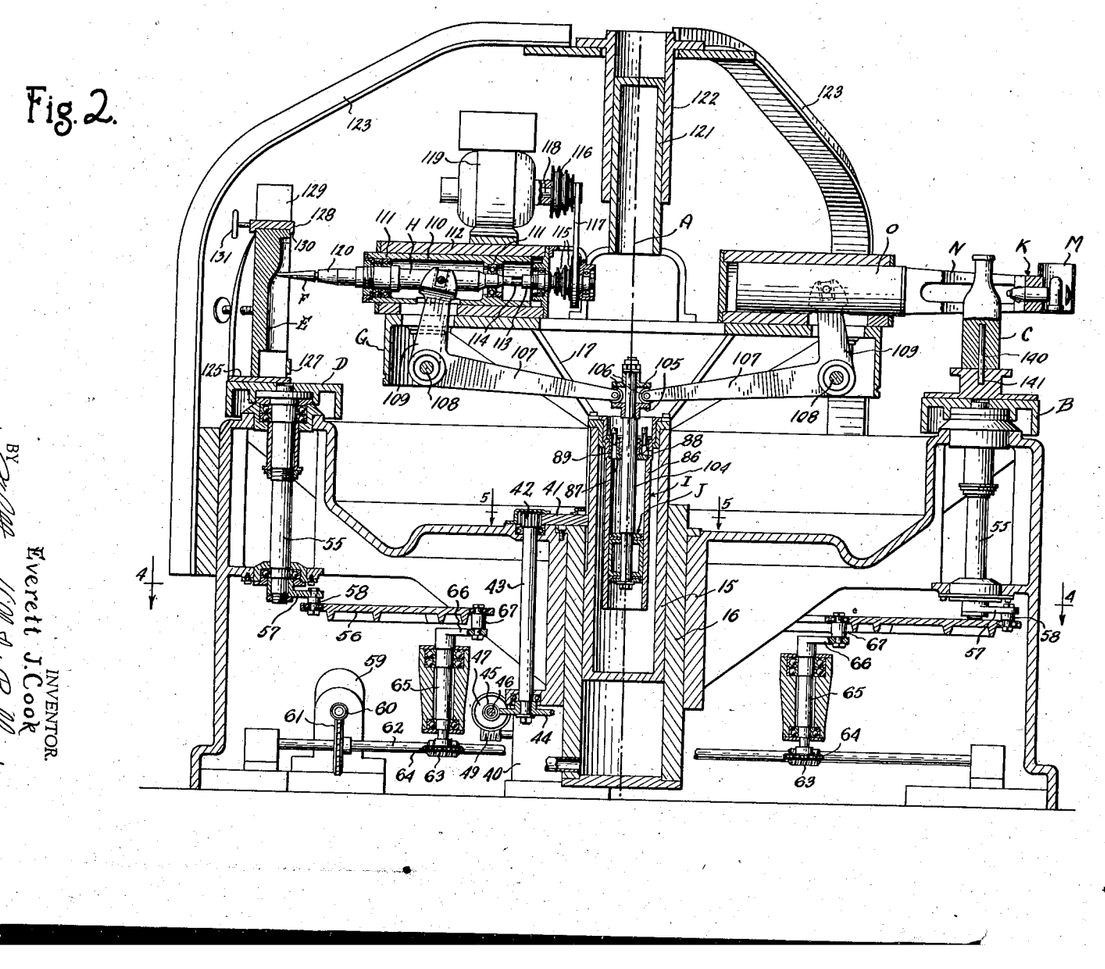
Figure 2 is a vertical sectional view taken on the line 2—2 of Figure 1.
Figures 3, 5, 6:
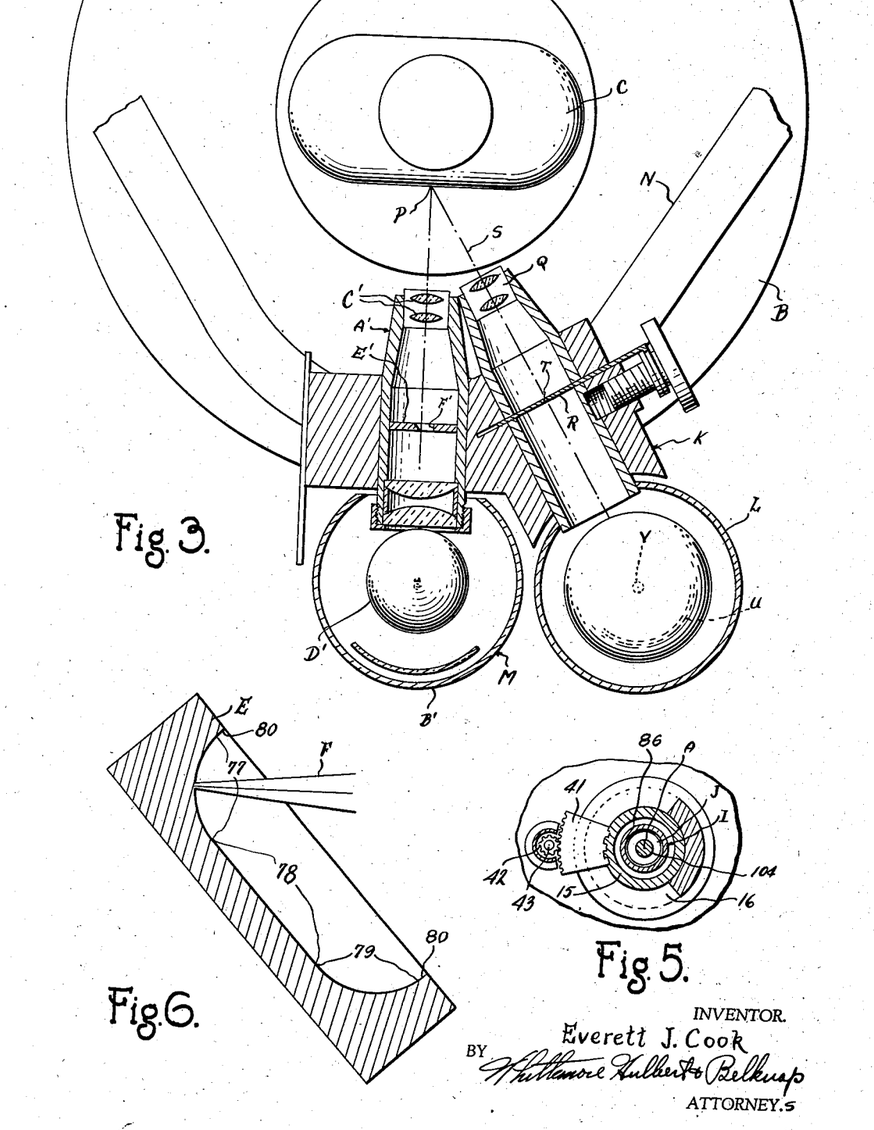
Figure 3 is a plan view, partly in section, of the scanning station.
Figure 5 is a sectional view taken substantially on the plane indicated by the line 5—5 of Figure 2.
Figure 6 is a plan view, partly in section, of one of the work pieces and associated tool.

Upon reference to Figure 3, it will be noted that an optical unit K is located opposite the pattern C at the radially outer side of the pattern and comprises a photo-electric cell device L and a light projector M. The optical unit is mounted on a carriage N supported on the table G opposite the pattern station and movable as a unit with the tools F radially of the axis A. Upon reference to Figure 2, it will be noted that the carriage N is connected to a non-rotatable spindle O identical to the tool spindles H and operatively connected to the piston J of the fluid pressure actuating means I for movement as a unit with the tool spindles H. Inasmuch as the tools F are located opposite the radially inner sides of the work blanks and, in view of the fact that the optical unit K is positioned opposite the radially outer side of the pattern, it follows that when the piston J is moved upwardly to effect a radially outward movement of the tool spindles H and optical unit spindle O toward the work blanks, the optical unit K is actually moved in a direction away from the adjacent surface of the pattern. On the other hand, when the piston J is moved downwardly to effect a radially inward movement of the tool spindles H and optical spindle O away from the work blanks, the optical unit K is moved toward the adjacent surface of the pattern.

Upon reference to Figure 3, it will be noted that the projector M is provided with a lens barrel A' having a casing B' at the outer end and having reversing lenses C' at the inner end. A lamp D' is supported in the casing B' to supply light rays to the barrel and a plate F' is supported in the lens barrel between the lamp and lenses C'. The plate E' is slotted, as at F', to permit the light rays to pass through the barrel and form an illuminated image on the adjacent surface of the pattern C. The image is reversed by the lenses C' and forms a sharply defined contour line P on the surface of the pattern. The contour line represents a section of the pattern as viewed by the photoelectric cell and is focused by the lenses Q on an apertured plate R supported in front, or at the inner side of the light sensitive cell.

The lens barrel of the photoelectric cell device L is supported with its axis extending at an angle to the axis of the lens barrel associated with the projector M, and the line of sight S through the aperture T in the plate R intersects the adjacent edge of the beam of light cast by the projector in the manner shown by the dot and dash lines in Figure 3. The optical unit K is shown in Figure 3 as being so located with respect to the adjacent surface of the pattern C that the line of sight S of the photoelectric cell device intersects the adjacent side of the beam of light cast by the projector on the surface of the pattern, and this relationship is maintained, irrespective of the contour of the pattern surface.

In actual practice, the image reflected from the surface of the pattern is focused on the plate R by the lenses Q with the contour line P of the image intersecting the aperture T through the plate R. With the above construction, it will be noted that the relative position of the surface of the pattern to be duplicated and the optical unit K will vary in accordance with the contour of the surface as the latter is traversed by the optical unit. In view of the fact that the line of sight S of the photoelectric cell device forms a fixed angle with the light beam cast by the projector, it follows that any movement of the surface of the pattern C relative to the optical unit K effects a movement of the reflected image relative to the aperture T. Remembering that the image is reversed by the projector lenses C' so that the illuminated portion of the image extends to the left of the contour line P, as viewed in Figure 3, the arrangement is such that if the surface of the pattern C approaches the optical unit K, the aperture T will, in effect, intercept the shadow or dark portion of the image and the intensity of light passing through the aperture T is substantially reduced. On the other hand, if the surface of the pattern C moves in a direction away from the optical unit K, the aperture T intercepts the illuminated portion of the image and the intensity of light passing therethrough is substantially increased.

With the above in mind, attention is called to the fact that the light sensitive plate U of the cell is located in a position to be affected by the light passing through the aperture T. When the intensity of light passing through the aperture T is increased, the photoelectric cell is rendered conductive in that an electron flow is effected from the cathode or plate U of the cell to the anode V in proportion to the intensity of the light energy passing through the aperture. In other words, the passage of light through the aperture T to the photoelectric cell causes a current to flow through the latter, and this relatively weak current is amplified by an amplifier W supported in a convenient position on the machine frame. The amplifier circuit is not shown in detail herein but may be similar to the one disclosed in the Thorpe application, Serial No. 146,943, filed June 7, 1937.

In any event, the amplifier is so designed that the potential in the output circuit of the last stage is reduced by the amplified photoelectric cell current to such an extent as to render the same non-conductive and is increased to render the last stage conductive when the light energy passing through the aperture T of the photoelectric cell is insufficient to provide the necessary flow of current through the cell.

The output circuit of the amplifier is connected to the load coil X of an electromagnet having an armature connected to a valve Y for actuating the same. The valve Y is located in the fluid pressure supply line for actuating the piston J and, accordingly, movement of the latter is controlled by the optical unit K. It follows from the above that the last stage of the amplifier is rendered conductive when the intensity of the light energy passing through the aperture T is dimensioned by movement of the surface of the pattern C in a direction toward the optical unit K. In view of the fact that the load coil X of the electromagnet is connected to the output circuit of the last stage of the amplifier, the electromagnet is energized and the valve Y is moved to a position wherein fluid pressure is admitted from the supply line to the underside of the piston J, causing the latter to move upwardly. Upward movement of the piston J feeds the tools F as a unit into their respective work blanks and causes the optical unit K to move in a direction away from the adjacent surface of the pattern C. This movement is continued until the aperture T intercepts the illuminated portion of the image whereupon sufficient light energy is impressed on the photoelectric cell to render the latter conductive. As soon as current flows through the photoelectric cell by reason of the latter being conductive, the last stage of the amplifier is rendered non-conductive and the load coil X of the electromagnet is de-energized. As a result, the spring Z counteracting the action of the load coil, moves the valve Y to a position wherein fluid under pressure is admitted to the means I at the upper side of the piston J. The action of the fluid under pressure on the top side of the piston J moves the latter downwardly and, in turn, moves the tools F in a direction away from the work blanks. Inasmuch as the optical unit K is also connected to the piston J, and is positioned at the radially outer side of the templet, it follows that this unit is moved with the tools in a direction toward the pattern C to return the aperture T in intersecting relation with the contour line P of the image.

From the above, it will be noted that the optical unit K is moved relative to the pattern C to maintain the aperture T in intersecting relation with the contour line P throughout the mold forming operation and, inasmuch as the tools F have the same movement as the optical unit, it follows that an exact replica of the surface of the pattern is duplicated in the work blanks. It will, of course, be understood that as a result of maintaining the aperture T in intersecting relation with the contour line P of the reflected image, the optical unit K and tools F have a pulsating movement. However, the sensitivity of the photoelectric cell is such that the pulsating movement is extremely slight and does not produce any noticeable interruptions on the surface of the mold.

Figures 8, 8A:
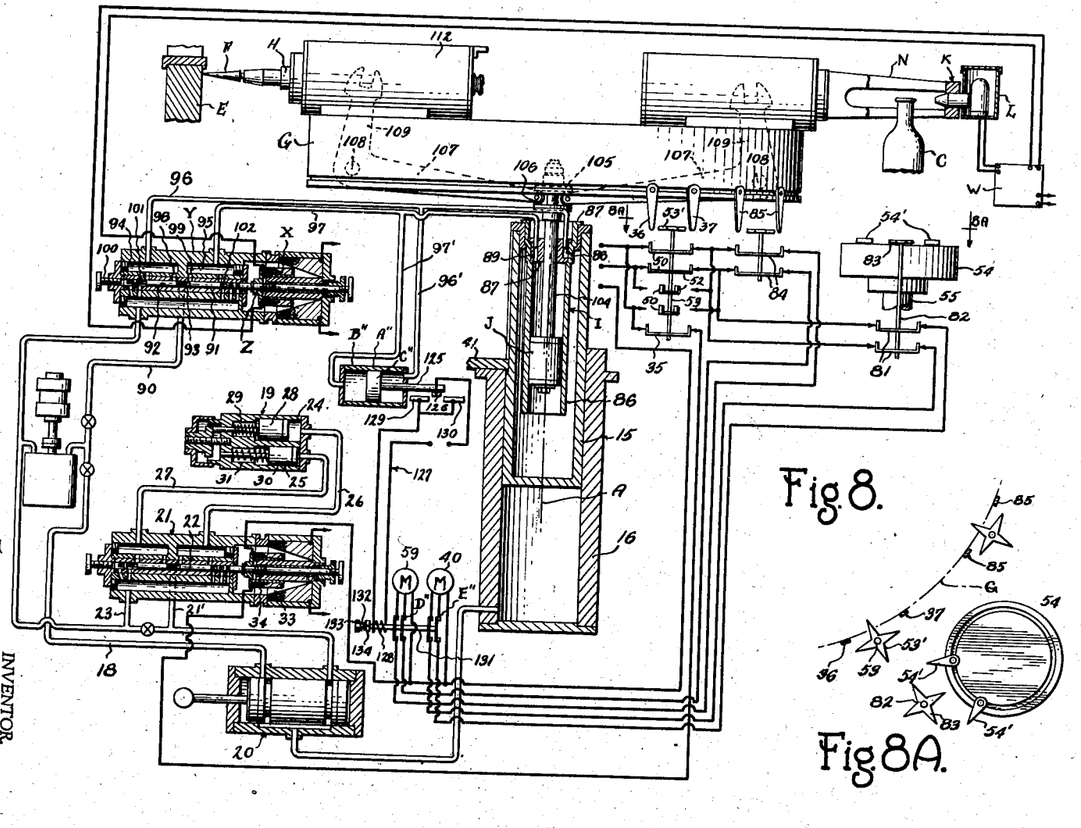
Figure 8 is a diagram of the control system.
Figure 8A is a section on the line 8A—8A of Figure 8.

It will be understood that the combined oscillating and vertical movements of the table G on the axis A provides for traversing the entire pattern surface to be duplicated by the contour line P of the image and effects a corresponding traversing movement of the tools F relative to the work blanks E. In detail, the table G is moved a limited distance in a downward direction at the end of the transverse feed of the table in each direction, and this is accomplished hydraulically by a piston 15 reciprocably mounted in a cylinder 16 having its axis coincident with the vertical axis A. The table G is secured to the upper end of the piston 15 by means of a bracket 17, and the piston is normally held in its uppermost position shown in Figure 8 by fluid under pressure in the cylinder at the bottom side of the piston. In Figure 8 of the drawings, the lower end of the cylinder 16 is shown as communicating with a fluid pressure supply line 18 and with a metering valve 19 through a valve 20. The valve 20 is manually operated and is adapted to selectively connect the lower end of the cylinder 16 to the fluid pressure supply line 18 and to the metering valve 19. When the valve 20 is in the position shown in Figure 8, the lower end of the cylinder communicates with the metering valve 19 through a four-way valve 21 having a cylinder and a plunger 22 reciprocably mounted in the cylinder. The cylinder of the valve 21, in addition to communicating with the valve 20 through the conduit 21', also communicates with an exhaust line 23 and with the chambers 24 and 25 of the metering valve 19 by the conduits 26 and 27, respectively. When the valve plunger 22 is moved to the position shown in Figure 8, fluid from the cylinder flows through the valve 20 to the chamber 24 in the metering valve 19 and forces the piston 28 in this chamber rearwardly against the action of the spring 29. At the same time, the valve 21 connects the chamber 25 in the metering valve 19 with the exhaust line 23 allowing the piston 30 in the chamber 25 to move forwardly, under the action of the spring 31, and to force the fluid in the chamber 25 to exhaust through the line 23. It will, of course, be understood that movement of the valve plunger 22 in the opposite direction reverses the above operation in that the chamber 25 is connected to the lower end of the cylinder 16 and the chamber 24 is connected to the exhaust line 23. With this construction, it will be noted that the table G is moved downwardly under the action of gravity by a step-by-step movement and that the extent of travel during each step depends upon the capacity of the metering chambers 24 and 25. When the piston 15 assumes its lowermost position in the cylinder 16, the valve 20 is operated to connect the supply line 18 with the lower end of the cylinder 16 and in this manner the piston 15 is again lifted to its initial starting position, shown in Figure 8.

It has been stated above that the vertical feed of the table G is effected at the end of each traversing feed of the tools F, and this is accomplished by accurately timing the operation of the valve 21. In detail, the valve plunger 22 is moved in one direction by an electromagnet 33, and in the opposite direction by a spring 34. The load coil of the electromagnet is located in an electrical circuit, shown in Figure 8 as also including an "on-and-off" switch 35 which is actuated by fingers 36 and 37 adjustably mounted on the table G for movement therewith. The space between the fingers is predetermined in dependence upon the extent of oscillation or traversing feed of the tools F required and function to successively open and close the circuit to the electromagnet 33 at the end of each transverse movement of the table G. In other words, the arrangement is such that at the end of the transverse travel of the table G in one direction, the finger 36 is operated to close the switch 35 and effect a movement of the valve plunger 22 to the position shown in Figure 8, wherein the chamber 24 of the metering valve 19 is connected to the bottom of the cylinder 16 and wherein the chamber 25 is connected to the exhaust line 23. On the other hand, when the table G approaches the end of its travel in the opposite direction, the finger 37 opens the switch 35 and permits the spring 34 to move the valve plunger 22 to its other extreme position wherein the chamber 24 of the metering valve is connected to the cylinder 16 and the chamber 25 is exhausted. Thus, it will be seen that the table G is fed downwardly a predetermined increment of travel at the end of traversing movement of the table G in each direction.

The radius of the arc through which the tools F are oscillated by the table G is so great as compared to the extent of oscillation of the tools, that, for all practical purposes, the tools may be considered as moved linearly relative to the work. For oscillating the table G about the axis A, I provide an electric motor 40 supported in any suitable manner on the frame structure of the machine and operatively connected to the piston 15 in the cylinder 16 for imparting a rotative movement to this cylinder. Upon reference to Figure 2, it will be noted that a gear segment 41 is splined on the piston 15 in a manner to provide for vertical movement of the piston relative to the gear, and the latter is adapted to mesh with a pinion 42 secured to the upper end of a vertical shaft 43. The lower end of the shaft 43 has a worm wheel 44 secured thereto and adapted to mesh with a worm 45 secured to a horizontal shaft 46. A worm wheel 47 is also secured to the shaft 46 and meshes with a worm 49 secured to the drive shaft of the motor 40. As a result of the foregoing, an operative connection is provided between the motor 40 and piston 15 for rotating the latter about the axis A and, since the table G is secured to the top of the piston, it follows that the table G is rotated by the piston 15.

The electric motor 40 is periodically reversed to secure the oscillatory movement of the table G, and this is effected by means of the switches 50, shown in the wiring diagram illustrated in Figure 8. The switches 50 reverse the polarity of the motor 40 in the usual manner and are actuated by the fingers 36 and 37, previously described as adjustably secured to the table G. It may be pointed out at this time that the rotary circuit breakers 52 of each of the switches 50 and the switch 35 are secured to a common shaft 53 mounted for oscillation and having an indexing wheel 53' secured to one end thereof for engagement with the fingers 36 and 37.

In cutting bottle molds of the general contour shown herein and particularly illustrated in Figure 6, it is desirable to oscillate the work supporting face plates D in order to maintain the cutting end of the tool F substantially normal to the surface of the work being cut. Of course, this necessitates also oscillating the pattern supporting face plates B and, for reasons which will be made more apparent as this description proceeds, the face plate 54 at the control station is also oscillated. Upon reference to Figure 2, it will be noted that each of the face plates is secured to the upper end of a vertical shaft 55 having the opposite ends suitably journalled in bearings supported by the frame structure of the machine. The lower end of each shaft 55 is also connected to a floating ring 56 oscillatable in a horizontal plane. In detail, a crank arm 57 is secured to the lower end of each shaft 55 and the extremity of this arm is pivotally connected to the ring 56 adjacent the periphery of the latter by means of a stud 58. The arrangement is such that oscillation of the ring 56 effects a corresponding oscillatory movement of each of the face plates.

Figure 4:
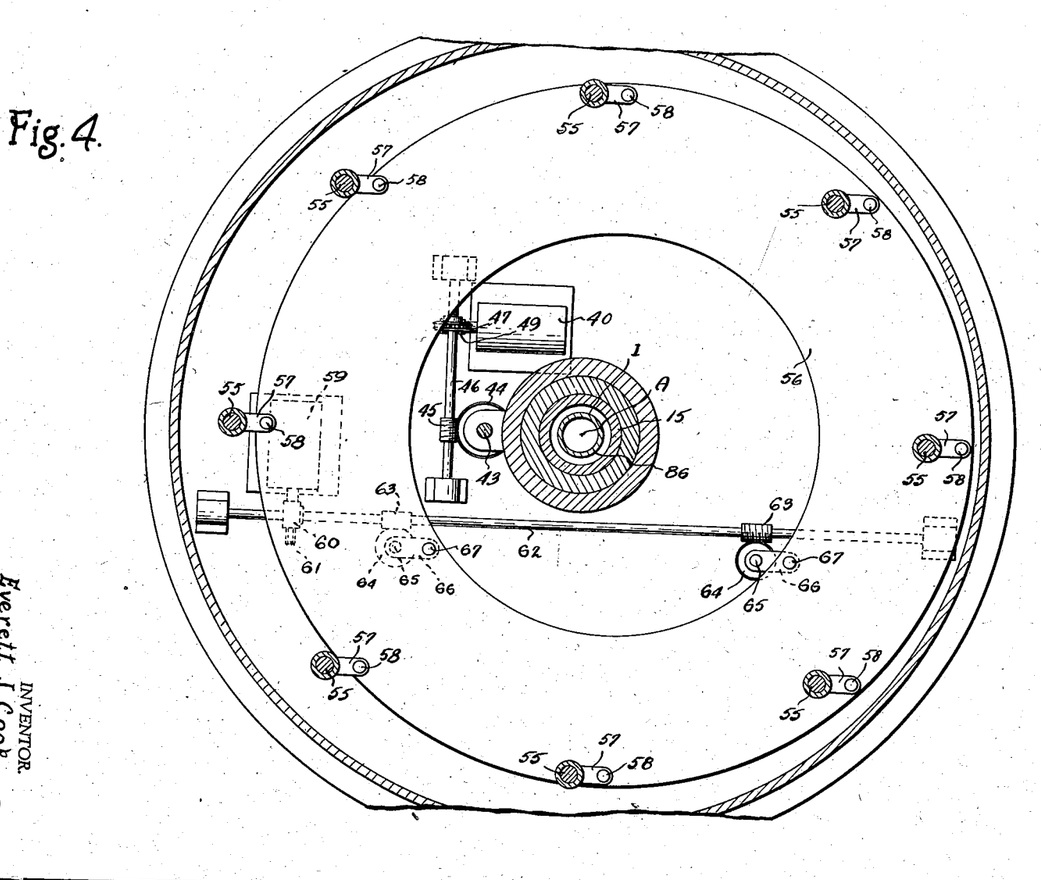
Figure 4 is a sectional view taken substantially on the plane indicated by the line 4—4 of Figure 2.

The ring 56 is oscillated by a reversible electric motor 59 having a worm 60 secured to the drive shaft thereof and adapted to mesh with a worm wheel 61 secured to a transversely extending horizontal shaft 62 which is suitably journaled in bearings supported by the frame structure of the machine. A pair of worms 63 are secured to the shaft 62 in axial spaced relationship and each worm meshes with a worm wheel 64 fixed to the lower end of a vertical shaft 65 also journalled in bearings mounted on the frame structure. A crank arm 66 is secured to the upper end of each shaft 65 and a stud 67 is secured to the free end of each crank arm. The studs are operatively connected to the ring 56 and serve to oscillate the latter. It will be observed from Figure 4 that the shafts 65 are spaced from each other circumferentially of the ring and cooperate with each other to impart the required driving force to the ring. It will also be apparent from the above that the ring 56 is carried by the cranks 57 and 66 so as to shift with the cranks in a horizontal plane.

The motor 59 is shown in Figure 8 as being in the same circuit as the motor 40, with the result that the polarity of this motor is reversed by the switches 50 at the same time the latter reverse the polarity of the motor 40. Of course, it will be understood that the gearing employed to oscillate both the table G and the face plates is predetermined so that the table G and face plates reach the end of their travel in each direction at the same time.

Reference has been made above to the fact that in some classes of work, it is desirable to discontinue either the oscillating movement of the face plates, or the traversing movement of the table G during the cycle of operation. As one example of the foregoing, attention is directed to Figure 6 wherein the shape of the molds to be cut renders it expedient to use both movements independently and simultaneously. In detail, when cutting the area 77 of the molds, it is desirable to discontinue the transverse lineal movement of the table G and when cutting the area 78, it is expedient to use only the lineal travel of the table G. After the tools travel over the area 78 and approach the area 79, it is expedient to again discontinue the lineal movement of the table G and to merely employ the oscillatory movement of the face plates. On the other hand, when cutting the side edge extremities 80 of the molds, it is desirable to use the combination of both movements so that there will be no interference between the tools F and the work blanks.

For accomplishing the above results, reference is again made to Figure 8, wherein the face plate at the control station 54 is shown as having a plurality of fingers 54' secured thereto for adjustment circumferentially of the face plate. These fingers are predeterminedly positioned to operate the "on-and-off" switch 81 in the circuit to the motor 40 to control the periods of oscillation of the table G required for the particular shape of work being performed. It will be noted that the rotor of the switch 81 is mounted on an oscillating shaft 82 having an indexing wheel 83 secured at one end thereof in the path of travel of the fingers 54'.

An "on-and-off" switch 84 is also located in the circuit to the rotary motor 59 and this switch is automatically operated to produce the desired action of the face plates by means of a plurality of fingers 85 adjustably secured to the table G. It will be seen, therefore, that with the above construction, the lineal travel of the table G and the oscillatory movement of the face plates may be used separately or in combination to suit the particular contour of the molds being cut.

In the brief description of the invention noted above, the operation of the valve Y by the electromagent X is defined as controlled by the photoelectric cell L and reference was also made to the fact that the valve Y controlled the operation of the fluid pressure means I. It will be remembered that the fluid pressure means I is operatively connected to the tools F and optical unit K for respectively moving the latter toward and away from the work blanks and pattern. In detail, the fluid pressure means I comprises a cylinder 86 located within the piston 15 on the vertical axis A and having the upper end secured to the piston, for vertical movement as a unit with the latter. The lower end of the cylinder 86 is preferably open, while the upper end of the cylinder is closed by means of a header 87 having ports 88 and 89 therein. The port 88 communicates with the space in the piston 15 around the cylinder 86 and allows fluid under pressure to enter the open end of the cylinder 86 at the underside of the piston J. The port 89, on the other hand, communicates with the interior of the cylinder 86 at the top side of the piston J, and both ports are adapted to be alternately connected to a fluid pressure supply line 90 through the medium of the valve Y.

In detail, the valve Y comprises a plunger 91 reciprocably mounted in a longitudinally extending bore 92 and having an axially extending reduced portion 93 intermediate the ends thereof communicating with the supply line 90. In addition, the valve casing is formed with two chambers 94 and 95, respectively, connected to the ports 88 and 89 by means of the conduits 96 and 97. The valve chambers also communicate with the axial bore 92 of the valve through the medium of the passages 98 and 99. The two passages 98 and 99 are predeterminedly spaced from each other axially of the bore 92 so as to alternately communicate with the reduced portion 93 of the valve plunger 91 in the extreme positions of the latter. In other words, when the electromagnet X is energized by the photoelectric cell L to move the valve plunger to the position thereof shown in Figure 8, fluid under pressure flows from the supply line 90 through the valve Y and conduit 97 to the cylinder 86 above the piston J. On the other hand, when the electromagnet is de-energized and the spring Z moves the valve plunger 91 to its opposite extreme position against the adjustable stop 100, fluid under pressure flows from the supply line 90 through the valve and conduit 96 into the piston 15 at the underside of the piston J. Of course, it will be understood that provision is made for alternately exhausting the fluid pressure admitted to the cylinder J at opposite sides of the piston. In detail, when the valve plunger is in the position thereof shown in Figure 8, the exhaust 23 is connected to the conduit 96 through the reduced portion 101 in the valve plunger 91 and, as a consequence, fluid pressure in the cylinder of the underside of the piston J is exhausted during the introduction of the fluid pressure into the cylinder 86 at the top side of the piston. On the other hand, when the valve plunger 91 is in its opposite position against the stop 100, the exhaust line 23 is connected to the conduit 97 through the medium of a reduced portion 102 in the valve plunger and, as a result, the space in the cylinder 86 at the top of the piston is exhausted at the time fluid under pressure is admitted to the cylinder 86 at the underside of the piston J.

With the above construction, it will be seen that the fluid pressure means for moving the tools F and the optical unit K toward and away from the work and pattern, respectively, is controlled by the photoelectric cell L.

In the present illustrative embodiment of the invention, the piston J is operatively connected to the tools F and optical unit K by the following relatively simple mechanism. In detail, the piston J is secured to a vertical rod 104 slidably mounted in the head 87 and having a pair of vertically spaced plates 105 secured to the upper end thereof beyond the head 87. The vertical spacing between the plates is predetermined to receive therebetween suitable rollers 106 carried by the radially inner ends of a plurality of bell crank levers 107. The number of bell crank levers corresponds to the number of spindles employed in the machine which, in the present instance, is seven. The bell crank levers 107 are pivoted intermediate the ends thereof to the table G, as at 108, and the free ends of the arms 109 of the levers are respectively connected to slidable casings 110. The arrangement is such that when the piston J is moved in an upward direction, the tool spindles H and the spindle O for the optical unit are moved radially outwardly and, when the piston J is moved downwardly, the aforesaid spindles are moved radially inwardly. It will be remembered, of course, that the optical unit K is positioned at the radially outer side of the pattern so that while the spindle O for this unit is moved in the same direction as the tools F, nevertheless, the optical unit actually moves in the opposite direction with respect to the pattern. As previously brought out, the reason for this is so that the tools will cut a recess in the work blanks, although it is believed obvious that the optical unit may be supported on the same side of the pattern as the tools F in the event it is desired to cut cameo.

Each of the six work spindles are identical in construction and the optical unit spindle O differs only from the work spindles in that the radially outer end of this spindle supports yoke N rather than a tool and, accordingly, only one of the spindle units will be defined in detail herein. Upon reference to Figures 2 and 7, it will be noted that the spindle assembly comprises a casing 110 extending axially of the spindle and that the spindle proper is journalled in bearings 111 supported in the casing at axially spaced points. The casing 110 is removably supported in a housing 112 secured to the table G and having a hollow shaft 113 supported in the radially inner end thereof on the axis of the spindle. The shaft 113 is adapted to telescopically receive the radially inner end of the spindle and is internally splined to cooperate with corresponding external splines 114 on the spindle to effect a driving connection therebetween. A series of change speed pulleys 115 are carried by the shaft 113 at the radially inner end of the latter and these pulleys are adapted to be selectively connected to a driving pulley 116 by means of a suitable belt 117. The driving pulley 116 is secured to the drive shaft 118 of a suitable electric motor 119 fixedly secured to the top of the housing 112. The motors are, of course, confined only to the tool carrying spindles since the only purpose of the same is to revolve the tools F at the desired cutting speed. The outer ends of the spindles H opposite the work stations are adapted to detachably receive a suitable quill 120 which, in turn, provides a removable holder for the tools F. The outer end of the spindle O, on the other hand, is secured to the yoke N which surrounds the pattern C and provides a support for the optical unit at the radially outer side of the pattern.

When duplicating some classes of work, it may be advantageous to discontinue oscillation of the table G and each of the face plates at the eight stations illustrated herein when the tools F are fed relative to the adjacent work blanks, and this is accomplished herein by opening the circuits to both the motors 40 and 59 when the tools feed into or out of the work. In detail, a stop valve A″ is provided having a cylinder B″ and having a piston C″ reciprocably mounted in the cylinder. One end of the cylinder B″ communicates with the conduit 96 by means of a conduit 96′ and the opposite end of the cylinder B″ communicates with the conduit 97 through the medium of a conduit 97′. In other words, the arrangement is such that when fluid under pressure is admitted to the cylinder 86 at the underside of the piston J to move the tools outwardly, the piston C″ is moved to the left in Figure 8 and when fluid under pressure is admitted through the conduit 97 to the cylinder 86 above the piston J to feed the tools inwardly, fluid under pressure is admitted to the cylinder through the conduit 97′ to move the piston C″ to the right in Figure 8.

With the above in mind, attention is called to the fact that a contact bar 125 is secured to the piston C″ for movement therewith as a unit and is provided with a contact 126 electrically connected in one side of an electric circuit 127. As shown in Figure 8, a solenoid having a coil 128 is arranged in the circuit 127 with one end connected to the contact 126 and with the opposite end connected to a pair of spaced contacts 129 and 130. The contacts 129 and 130 are spaced from each other in the path of travel of the contact 126 on opposite sides of the contact 126 and cooperate with the latter to form a switch. A core in the form of a plunger 131 is supported for sliding movement in the coil 128 and is connected to a pair of switches E″ and D″, respectively, located in the circuits to the motors 40 and 59. The switches E″ and D″ are normally maintained in their closed positions by means of a spring 132 surrounding the plunger 131 with one end engaging a fixed abutment 133 and with the opposite end engaging a collar 134 secured to the plunger.

With the above construction, it will be noted that when the piston C″ is moved by fluid pressure to the right in Figure 8 a sufficient distance to engage the contact 126 with the contact 130, the circuit 127 to the solenoid coil 128 is closed permitting the coil to move the plunger 131 against the action of the spring 132 to open both the switches D″ and E″. This, of course, discontinues the operation of both the motors 40 and 59 and stops the traversing movements of the face plates and table G. At the same time, fluid under pressure is, of course, admitted to the cylinder 86 above the piston J with the result that the traversing movement of the work and pattern are discontinued during the time the tools and optical unit are moved outwardly. Assuming now that fluid pressure is admitted to the cylinder 86 at the underside of the piston J to feed the tools into the work, it will be noted that fluid under pressure is admitted to the cylinder B″ through the conduit 96′ to move the piston C″ to the left in Figure 8. This movement causes the contact 126 to disengage from the contact 130 and open the circuit 127. Opening of the circuit 127 permits the spring 132 to return the switches E″ and D″ to their closed positions. As a result, the traversing movement of the work and pattern continues (unless, of course, the extent of feeding of the tools into the work is sufficient to engage the contact 126 with the contact 129. If this conditions exists, the circuit 127 is again closed to energize the solenoid coil 128 and again discontinue the traversing movements by opening the switches E″ and D″. It may be pointed out at this time that the stop valve is not sufficiently sensitive to interfere with the traversing movement during the normal pulsating movements of the tools and optical unit required to maintain the aperture T in intercepting relationship with the contour line P and may be entirely eliminated when duplicating surfaces free from abrupt shoulders or recesses of substantial dimension.

It will be noted from Figure 2 that the table G and parts carried thereby are supported by the piston 15 in the cylinder 16 and since the contacting area of the piston 15 with the cylinder is substantially reduced when the table is in its uppermost position, it may be desirable to provide a supplementary support for the table G. This is accomplished, in the present instance, by securing a plunger 121 to the upper end of the table G on the vertical axis A of the machine and by fastening a cylinder 122 on the frame structure of the machine in a position to telescopically receive the plunger 121. The cylinder 122 is rigidly supported from the machine frame by means of the braces 123 and the axial length of the cylinder and piston is sufficient to cooperate with the piston 15 and cylinder 16 to effectively support the table G throughout the entire cycle of operation.

Figures 7, 9, 10, 11:
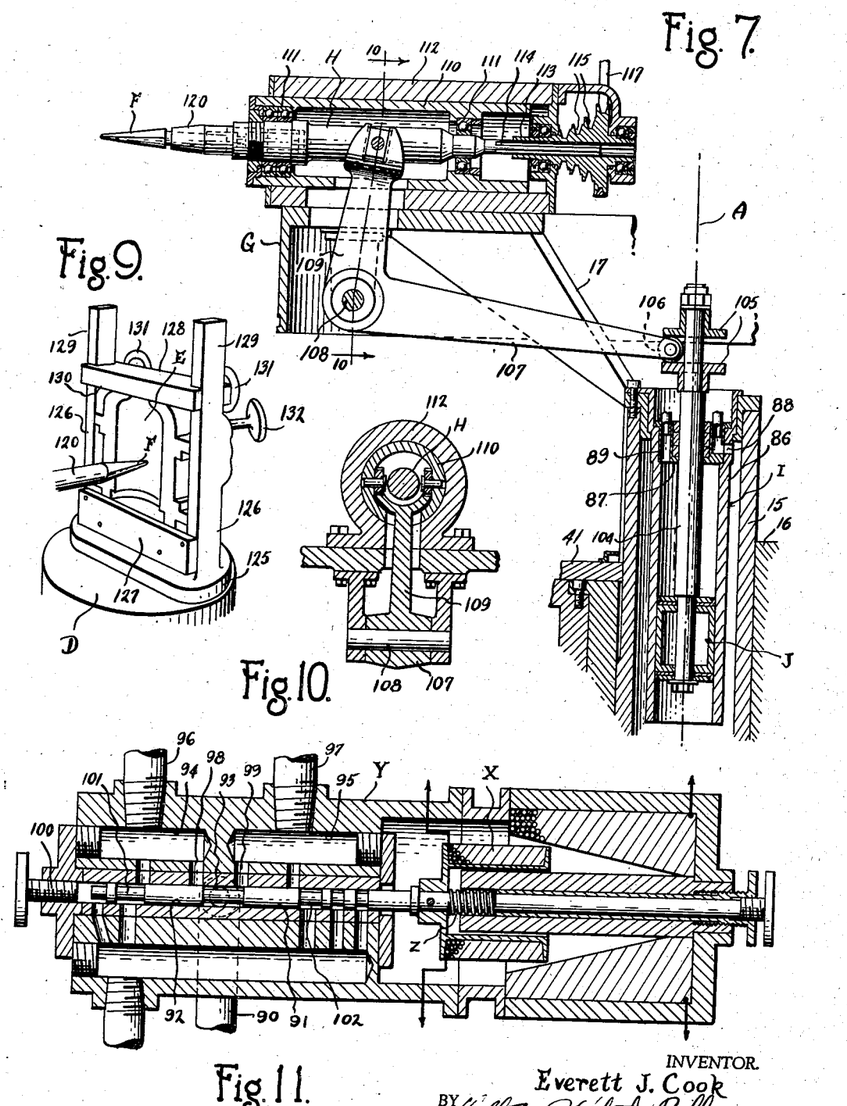
Figure 7 is an enlarged sectional view of a portion of Figure 2.
Figure 9 is a perspective view of one of the work holding clamps.
Figure 10 is a section on line 10—10 of Figure 7.
Figure 11 is an enlarged sectional view of one of the electromagnetically controlled valves illustrated in Figure 8.

In Figure 9 of the drawings, I have shown one type of clamp that may be provided on each of the work supporting face plates D to secure the work blanks thereto. In detail, each clamp is provided with a base 125 secured in any suitable manner to the top of one of the face plates D and having upwardly projecting side walls 126 adapted to extend around the work blank E at the outer side of the latter. The portions of the side walls adjacent the base 125 are connected by means of a bar 127 adapted to assume a position at the radially inner side of the work blank E, and the upper ends of the side walls are connected by means of a bar 128 slidably supported on extensions 129 projecting upwardly from the side walls 126. The bar 128 is shown in Figure 9 as having a downwardly extending flange 130 for engagement with the radially inner side of the work blank when the bar is in its operative position with respect to the work blank. The clamping bar 128 is held in its operative position by means of a pair of clamping screws 131 threadedly mounted in opposite ends of the bar and engageable with the extensions 129. The work blank is clamped against the lower bar 125 and the depending flange 130 by means of similar clamping screws 132 threaded in the side walls 126 for engaging the outer surface of the work blank. This arrangement insures effectively clamping the work blanks to their respective face plates for oscillation therewith as a unit.

Any suitable means may be employed for holding the pattern C on its associated face plate so that the pattern will move as a unit with the face plate. In detail, the pattern may be provided with a dowel pin 140 which extends below the bottom of the pattern and has a pressed fit in an opening 141 formed in the pattern face plate.

From the foregoing, it will be observed that I have provided a relatively simple, compact duplicating machine wherein a plurality of work blanks may be simultaneously fashioned by tools accurately movable in accordance with the countour of a particular pattern by means controlled by a light sensitive cell. It will also be apparent that with my improved duplicating machine, the work blanks are uniformly and accurately fashioned to the desired contour by tools controlled by a single optical system in such a manner as to require the minimum amount of attention on the part of the operator.

What I claim as my invention is:

1. In a duplicating machine, supporting means for a plurality of work blanks and a pattern having a surface to be reproduced on the work blanks, a plurality of tools for fashioning the work blanks and supported for movement toward and away from the work blanks, an optical system for scanning the surface aforesaid of the pattern and including a light sensitive cell rendered conductive and non-conductive in accordance with variations in the contour of said surface, means for moving the tools and optical system as a unit relative to the work blanks and pattern to cause the entire surface aforesaid of the pattern to be scanned by the optical system and to cause corresponding surfaces of the work blanks to be traversed by the tools, and means controlled by the light sensitive cell for moving the tools as a unit toward and away from the work blanks.

2. In a duplicating machine, supporting means for a plurality of work blanks and a pattern having a surface to be reproduced on the work blanks, a plurality of tools for fashioning the work blanks and supported for movement toward and away from the work blanks, an optical system for scanning the surface aforesaid of the pattern and including a light sensitive cell rendered conductive and non-conductive in accordance with variations in the contour of said surface, means for moving the tools and optical system as a unit relative to the work blanks and pattern to cause the entire surface aforesaid of the pattern to be scanned by the optical system and to cause corresponding surfaces of the work blanks to be traversed by the tools, means for oscillating the work blanks and pattern relative to the tools and optical system, and means controlled by the light sensitive cell for moving the tools toward and away from the work blanks.

3. In a duplicating machine, supporting means for a plurality of work blanks and a pattern having a surface to be reproduced on the work blanks, a plurality of tools for fashioning the work blanks and supported for movement toward and away from the work blanks, an optical system for scanning the surface aforesaid of the pattern and including a light sensitive cell rendered conductive and non-conductive in accordance with variations in the contour of said surface, supporting means for the tools and optical system mounted for oscillation to cause the optical system to traverse the surface aforesaid and to cause the tools to traverse the work blanks, means for oscillating said supporting means, and means controlled by the light sensitive cell for moving the tools toward and away from the work blanks.

4. In a duplicating machine, supporting means for a plurality of work blanks and a pattern having a surface to be reproduced on the work blanks, a plurality of tools for fashioning the work blanks and supported for movement toward and away from the work blanks, an optical system for scanning the surface aforesaid of the pattern and including a light sensitive cell rendered conductive and non-conductive in accordance with variations in the contour of said surface, supporting means for the tools and optical system, means for oscillating the latter supporting means and for moving the same a predetermined increment of travel along the axis of oscillation at the end of each oscillating movement to cause the entire surface aforesaid of the pattern to be traversed by the optical system and to cause corresponding surfaces of the work blanks to be traversed by the tools, and means controlled by the light sensitive cell for moving the tools toward and away from the work blanks.

5. In a duplicating machine, supporting means for a plurality of work blanks and a pattern having a surface to be reproduced on the work blanks, a plurality of tools for fashioning the work blanks and supported for movement toward and away from the work blanks, an optical system for scanning the surface aforesaid of the pattern and including a light sensitive cell rendered conductive and non-conductive in accordance with variations in the contour of said surface, means for moving the tools and optical system as a unit relative to the work blanks and pattern to cause the entire surface aforesaid of the pattern to be scanned by the optical system and to cause corresponding surfaces of the work blanks to be traversed by the tools, means controlled by the light sensitive cell for moving the tools as a unit toward and away from the work blanks, and means for rendering the traversing means inoperative when the tools are moved toward the work blanks.

6. In a duplicating machine, supporting means for a plurality of work blanks and a pattern having a surface to be reproduced on the work blanks, a plurality of tools for fashioning the work blanks and supported for movement toward and away from the work blanks, an optical system for scanning the surface aforesaid of the pattern and including a light sensitive cell rendered conductive and non-conductive in accordance with variations in the contour of said surface, supporting means for the tools and optical system, means for oscillating the latter supporting means and for moving the same a predetermined increment of travel along the axis of oscillation at the end of each oscillating movement to cause the entire surface aforesaid of the pattern to be traversed by the optical system and to cause corresponding surfaces of the work blanks to be traversed by the tools, means for oscillating the work blanks and pattern relative to the tools and optical system, means controlled by the light sensitive cell for moving the tools toward and away from the work blanks, and means for rendering both of the oscillating means inoperative during the interval the tools move toward the work blanks.

7. In a duplicating machine, supporting means for a plurality of work blanks and a pattern having a surface to be reproduced on the work blanks, a plurality of tools for fashioning the work blanks and supported for movement toward and away from the work blanks, an optical system for scanning the surface aforesaid of the pattern and including a light sensitive cell rendered conductive and non-conductive in accordance with variations in the contour of said surface, supporting means for the tools and optical system, means for oscillating the latter supporting means and for moving the same a predetermined increment of travel along the axis of oscillation at the end of each oscillating movement to cause the entire surface aforesaid of the pattern to be traversed by the optical system and to cause corresponding surfaces of the work blanks to be traversed by the tools, means for oscillating the work blanks and pattern relative to the tools and optical system, means controlled by the light sensitive cell for moving the tools toward and away from the work blanks, and means controlling the operation of both of said oscillating means to render one or the other inoperative depending upon the contour of the surface to be duplicated.

8. In a duplicating machine, supporting means for a plurality of work blanks and a pattern having a surface to be reproduced on the work blanks, a plurality of tools for fashioning the work blanks and supported for movement toward and away from the work blanks, an optical system for scanning the surface aforesaid of the pattern and including a light sensitive cell rendered conductive and non-conductive in accordance with variations in the contour of said surface, a table supporting the tools and optical system, a reversible motor for oscillating the table relative to the work blanks and pattern, means for reversing said motor, a reversible motor for oscillating the supporting means for the work blanks and pattern, means on said table for reversing the latter motor at the time the first motor is reversed, and means controlled by the light sensitive cell for moving the tools as a unit relative to the table toward and away from the work blanks.

9. In a duplicating machine, supporting means for a plurality of work blanks and a pattern having a surface to be reproduced on the work blanks, a plurality of tools for fashioning the work blanks and supported for movement toward and away from the work blanks, an optical system for scanning the surface aforesaid of the pattern and including a light sensitive cell rendered conductive and non-conductive in accordance with variations in the contour of said surface, a table supporting the tools and optical system, a reversible mortor for oscillating the table relative to the work blanks and pattern, a reversible motor for oscillating the supporting means for the work blanks and pattern, means operated by the table for reversing both motors, means also operated by the table for starting and stopping the second motor during the oscillating cycle of the supporting means operated thereby, means oscillated by the second motor for starting and stopping the first motor during the oscillating cycle of the table, and means controlled by the light sensitive cell for moving the tools as a unit relative to the table toward and away from the work blanks.

10. In a duplicating machine, supporting means for a plurality of work blanks and a pattern having a surface to be reproduced on the work blanks, a plurality of tools for fashioning the work blanks and supported for movement toward and away from the work blanks, an optical system for scanning the surface aforesaid of the pattern and including a light sensitive cell rendered conductive and non-conductive in accordance with variations in the contour of said surface, supporting means for the tools and optical system, means for oscillating the latter supporting means relative to the work blanks and pattern, means for moving the latter supporting means by a step-by-step movement along the axis of oscillation of the latter supporting means, means operated by the latter supporting means for controlling the last named means to effect a predetermined movement of the supporting means along the axis of oscillation thereof at the ends of travel of the supporting means in each direction, and means controlled by the light sensitive cell for moving the tools toward and away from the work blanks.

11. In a duplicating machine, supporting means for a plurality of work blanks and a pattern having a surface to be reproduced on the work blanks, a plurality of tools for fashioning the work blanks and supported for movement toward and away from the work blanks, an optical system for scanning the surface aforesaid of the pattern and including a light sensitive cell rendered conductive and non-conductive in accordance with variations in the contour of said surface, an oscillatable table supporting the tools and optical system, a reversible motor for oscillating the table relative to the work blanks and pattern, a reversible motor for oscillating the supporting means for the work and pattern, means for moving the table by a step-by-step movement along the axis of oscillation of the table, means operated by the table for reversing both motors and for simultaneously actuating the latter means to effect movement of the table along the axis of oscillation thereof, and means controlled by the light sensitive cell for moving the tools toward and away from the work blanks.

12. In a duplicating machine, a generally circular table, means supporting a plurality of work blanks and a pattern in spaced relation to each other around the periphery of the table, a tool mounted on the table opposite each work blank for movement radially of the axis of the table toward and away from the work blanks, an optical system on said table opposite the pattern for scanning the surface of the pattern to be reproduced on the work blanks and including a light sensitive cell rendered conductive and non-conductive in accordance with variations in the contour of said surface, an element reciprocable on the axis of the table and operatively connected to the radially inner ends of the tools for moving the latter toward and away from the work blanks, and means controlled by the light sensitive cell for reciprocating said element.

13. In a duplicating machine, a generally circular table, a plurality of work supporting members and a pattern supporting member concentrically arranged with respect to the axis of the table beyond the periphery of the latter, a tool mounted on the table opposite each work support for movement radially of the axis of the table toward and away from the work blanks on said members, an optical system on said table opposite the pattern supporting member for scanning the surface of the pattern to be reproduced on the work blanks and including a light sensitive cell rendered conductive and non-conductive in accordance with variations in the contour of said surface, means for oscillating the table about its axis relative to the supporting members aforesaid, and means controlled by the light sensitive cell for moving the tools as a unit toward and away from the work blanks.

14. In a duplicating machine, a table supported for relative movement, a plurality of work supporting members and a pattern supporting member concentrically arranged with respect to the axis of the table, a tool mounted on the table opposite each work support for movement radially of the axis of the table toward and away from the work blanks on said members, an optical system on said table opposite the pattern supporting member for scanning the surface of the pattern to be reproduced on the work blanks and including a light sensitive cell rendered conductive and non-conductive in accordance with variations in the contour of said surface, means for oscillating the table about its axis relative to the supporting members aforesaid and for moving the table a predetermined increment of travel along the axis of oscillation at the end of oscillation in each direction, an element reciprocable on the axis of oscillation of the table independent of the latter means and operatively connected to the radially inner ends of the tools for moving the latter toward and away from the work blanks, and means controlled by the light sensitive cell for reciprocating said element.

15. In a duplicating machine, a table, means for supporting a plurality of work blanks and a pattern in spaced relation to each other around the table, a tool mounted on the table opposite each work blank for movement generally radially of the axis of the table toward and away from the work blanks, an optical system on said table opposite the pattern for scanning the surface of the pattern to be reproduced on the work blanks and including a light sensitive cell rendered conductive and non-conductive in accordance with variations in the contour of said surface, means for oscillating the supporting means relative to the tools and optical system, and means controlled by the light sensitive cell and connected to the radially inner ends of the tools for moving the latter toward and away from the work blanks.

16. In a duplicating machine, a table mounted for rotative movement, a plurality of work supporting members and a pattern supporting member arranged in spaced relation to each other around the axis of the table, a tool mounted on the table opposite each work support for movement generally radially of the axis of the table toward and away from the work blanks on said members, an optical system on said table opposite the pattern supporting member for scanning the surface of the pattern to be reproduced on the work blanks and including a light sensitive cell rendered conductive and non-conductive in accordance with variations in the contour of said surface, means for oscillating the table about its axis relative to the supporting members aforesaid and for moving the table a predetermined increment of travel along the axis of oscillation at the end of oscillation in each direction, a ring surrounding the axis of oscillation of the table and operatively connected to the supporting members aforesaid, means for oscillating the ring to effect an oscillation of the supporting members relative to the table, and means controlled by the light sensitive cell and operatively connected to the radially inner ends of the tools for moving the latter toward and away from the work blanks.

17. In a duplicating machine, a plurality of tools extending generally radially outwardly from a common point, a work blank supported opposite each tool, means for relatively moving the work blanks and tools in directions to cause the work blanks to be traversed by their respective tools, a pattern having a surface to be reproduced on the work blanks, means reciprocable in directions extending transversely to the directions of movement of the tools and operatively connected to the tools for moving the latter as a unit toward and away from the work blanks, and means responsive to variations in contour of the pattern for controlling the operation of the last named means.

18. In a duplicating machine, a table supported for rotative movement, means supporting a plurality of work blanks in spaced relation to each other around the axis of rotative movement of the table, a tool mounted on the table opposite each work blank for movement relative to the table generally radially of the axis of rotation of the table toward and away from the work blanks, means operatively connected to the table for imparting a rotative movement to the table relative to the work blanks, means operatively connected to the tools for moving the latter toward and away from the work blanks, a pattern having a surface to be duplicated in the work blanks, and means responsive to variations in contour of the pattern for controlling the operation of the tool operating means.

19. In a duplicating machine, a table supported for rotative movement, means supporting a plurality of work blanks and a pattern in spaced relation to each other around the axis of rotative movement of the table, a tool mounted on the table opposite each work blank for movement generally radially of the axis of rotation of the table toward and away from the work blanks, means operatively connected to the table for imparting a rotative movement to the latter relative to the work blanks and pattern, an element reciprocable in directions extending transversely to the directions of movement of the tools and operatively connected to the tools for moving the latter toward and away from the work blanks, means for reciprocating said element, and means responsive to variations in contour of the pattern for controlling the operation of said last named means.

20. In a duplicating machine, a table supported for rotative movement, means supporting a plurality of work blanks and a pattern in spaced relation to each other around the axis of rotative movement of the table, a tool mounted on the table opposite each work blank for movement generally radially of the axis of rotation of the table toward and away from the work blanks, means operatively connected to the table for imparting a rotative movement to the latter relative to the work blanks and pattern, means for moving the table in a direction parallel to the axis of rotative movement thereof, an element reciprocable in a direction parallel to the axis of rotative movement of the table and operatively connected to the tools for moving the latter toward and away from the work blanks, means supported on the table opposite the pattern and movable by the element aforesaid relative to the table toward and away from the pattern in dependence upon variations in contour of the pattern, and means controlled by said last named means and operatively connected to the element for reciprocating the latter.

21. In a duplicating machine, a table supported for oscillation about an axis, means supporting a plurality of work blanks and a pattern in spaced relation to each other around the axis of oscillation of the table, a tool mounted on the table opposite each work blank for movement generally radially of the axis of oscillation of the table toward and away from the work blanks, means operatively connected to the table for oscillating the latter relative to the work blanks and pattern, means movable toward and away from the pattern in accordance with variations in the surface contour of the latter, and means controlled by the last named means for effecting corresponding movement of the tools toward and away from their respective work blanks.

22. In a duplicating machine, a table supported for oscillation about an axis, means supporting a plurality of work blanks and a pattern in spaced relation to each other around the axis of oscillation of the table, a tool mounted on the table opposite each work blank for movement generally radially of the axis of oscillation of the table toward and away from the work blanks, means for oscillating the table about its axis relative to the work blanks and pattern, means for moving the table a predetermined increment of travel along the axis of oscillation thereof at the end of oscillatory movement in each direction, an element reciprocable in directions parallel to the axis of oscillation of the table and operatively connected to the tools for moving the latter toward and away from the work blanks, means supported on the table opposite the pattern and movable by said element toward and away from the pattern in response to variations in the contour of the latter, and means controlled by the last named means for reciprocating said element.

23. In a duplicating machine, a table supported for oscillation about an axis, means supporting a plurality of work blanks and a pattern in spaced relation to each other around the axis of oscillation of the table, a tool mounted on the table opposite each work blank for movement generally radially of the axis of oscillation of the table toward and away from the work blanks, means for oscillating the table about its axis relative to the work blanks and pattern, means for oscillating the pattern and each work blank relative to the table, means supported on the table opposite the pattern and movable in directions toward and away from the pattern in dependence upon variations in contour of said pattern, and means controlled by the last named means for effecting corresponding movement of the tools toward and away from their respective work blanks.

24. In a duplicating machine, a plurality of tools extending generally radially outwardly from a common point, a work blank supported opposite each tool, a pattern having a surface to be reproduced in the work blanks, an optical system opposite the surface aforesaid of the pattern for scanning said surface and including a light sensitive cell rendered conductive and non-conductive in accordance with variations in the contour of the pattern surface; means for relatively moving the work blanks and tools to cause the tools to traverse the adjacent surfaces of the work blanks and for also correspondingly relatively moving the pattern and optical system, and means controlled by the light sensitive cell for relatively moving the work blanks and tools toward and away from each other.

25. In a duplicating machine, means for supporting a plurality of work blanks and a pattern in spaced relation to each other around a common center, a table supported for rotation relative to the work blanks and having its axis of rotation intersecting the center about which the work blanks and pattern are positioned, a tool mounted on the table opposite each work blank for movement radially of the axis of the table toward and away from the work blanks, means also mounted on said table for movement toward and away from the pattern and responsive to variations in contour of the pattern to effect corresponding relative movement of the tools relative to the work blanks, means for oscillating the table and for moving the same a predetermined increment of travel along the axis of oscillation at the end of each oscillating movement to cause the entire surface of the pattern to be traversed by the last named means and to cause corresponding surfaces of the work blanks to be traversed by the tools, means for oscillating the work blanks and pattern relative to the tools and optical system, and means controlling the operation of both of said oscillating means to render one or the other inoperative depending upon the contour of the surface to be duplicated.

26. In a duplicating machine, a plurality of work blanks and a pattern supported in spaced relation to each other around a common center, a table supported for rotation and having its axis intersecting the common center aforesaid, a tool mounted on the table opposite each work blank for movement radially of the axis of the table toward and away from the work blanks, an optical system mounted on the table in a position opposite the pattern for movement toward and away from the latter, said optical system including means for casting an image on one surface of the pattern having a contour line representing one section of said surface and also including a light sensitive cell having an aperture intersecting the contour line of the image on the surface of the pattern, a member reciprocable in directions extending transversely to the directions of movement of the tools and optical system and operatively connected to the tools and optical system to effect movement thereof as a unit toward and away from the work blanks and pattern to maintain the aperture of the light sensitive cell in intersecting relation with the contour line of the image on the surface of the pattern, and means controlled by the light sensitive cell for reciprocating said member.

27. In a duplicating machine, a plurality of tools extending generally radially outwardly from a common point, a work blank supported opposite the outer end of each tool, a pattern having a surface to be reproduced on the work blanks, means engageable with the inner ends of the tools for moving the latter as a unit in directions toward and away from the work blanks, and an optical system for scanning the surface of the pattern to be reproduced in the work blank and including a light sensitive cell responsive to radiant energy reflected from said surface to control the tool moving means.

28. In a duplicating machine, a plurality of tools extending generally radially outwardly from a common point, a work blank supported opposite the outer end of each tool, a pattern having a surface to be reproduced on the work blanks, an optical system having means for projecting a light image on said surface of the pattern with a contour line representing one section of the pattern and having a light sensitive cell positioned to receive radiant energy reflected from the surface of the pattern, said light sensitive cell having an aperture intersecting the contour line an being responsive to variations in the light intensity reflected from the surface of the pattern at opposite sides of the contour line, means for relatively moving the optical system and pattern and for correspondingly relatively moving the work blanks and tools to cause the surface of the pattern to be traversed by the optical system and to also cause the corresponding surfaces of the work blanks to be traversed by the tools, means controlled by the light sensitive cell and engageable with the inner ends of the tools and optical system for moving the optical system toward and away from the pattern to maintain the aperture in intersecting relationship with the contour line and for correspondingly moving the tools as a unit relative to the work blanks.

EVERETT J. COOK.